(12) United States Patent
Lidström et al.

(10) Patent No.: US 12,508,946 B2
(45) Date of Patent: Dec. 30, 2025

(54) METHOD FOR OPERATING A SWITCHING ARRANGEMENT

(71) Applicant: VOLVO TRUCK CORPORATION, Gothenburg (SE)

(72) Inventors: Emil Lidström, Torslanda (SE); Ana Dolado, Las Rosas de Madrid (ES)

(73) Assignee: VOLVO TRUCK CORPORATION, Gothenburg (SE)

( * ) Notice: Subject to any disclaimer, the term of this patent is extended or adjusted under 35 U.S.C. 154(b) by 42 days.

(21) Appl. No.: 18/512,667

(22) Filed: Nov. 17, 2023

(65) Prior Publication Data

US 2024/0174131 A1    May 30, 2024

(30) Foreign Application Priority Data

Nov. 28, 2022    (EP) .................................... 22209888

(51) Int. Cl.
    *B60L 58/18*    (2019.01)
(52) U.S. Cl.
    CPC ......... *B60L 58/18* (2019.02); *B60L 2240/547* (2013.01); *B60L 2270/20* (2013.01)
(58) Field of Classification Search
    None
    See application file for complete search history.

(56) References Cited

U.S. PATENT DOCUMENTS

| | | | |
|---|---|---|---|
| 11,299,063 B2 | 4/2022 | Wang et al. | |
| 11,750,014 B2 | 9/2023 | Burkell et al. | |
| 2014/0012446 A1* | 1/2014 | Kumar | B60W 10/08 903/930 |

(Continued)

FOREIGN PATENT DOCUMENTS

| | | |
|---|---|---|
| DE | 102012018321 A1 | 3/2013 |
| EP | 4119390 A1 | 1/2023 |

OTHER PUBLICATIONS

Extended European Search Report in corresponding European Application No. 22209888.1 dated May 17, 2023 (8 pages).

(Continued)

*Primary Examiner* — Rexford N Barnie
*Assistant Examiner* — Aqeel H Bukhari
(74) *Attorney, Agent, or Firm* — Jeffri A. Kaminski; Venable LLP

(57) ABSTRACT

A method for operating a switching arrangement of an energy storage system including a common traction voltage bus and a plurality of parallelly arranged battery packs connectable to the common traction voltage bus is provided. The switching arrangement comprising an associated contactor for each battery pack, the contactors being configured to connect the battery packs to and from the common traction voltage bus by closing and opening. The method comprises: identifying a non-connected battery pack to be connected to the common traction voltage bus, determining the voltage difference between the common traction voltage bus and the identified battery pack, adjusting the current of the common traction voltage bus to reduce the voltage difference between the common traction voltage bus and the identified battery pack, closing the contactor associated with the identified battery pack to connect the identified battery pack to the common traction voltage bus.

18 Claims, 3 Drawing Sheets

(56) References Cited

U.S. PATENT DOCUMENTS

| | | | |
|---|---|---|---|
| 2014/0239856 A1* | 8/2014 | Inniss | B60L 3/0046 |
| | | | 318/139 |
| 2015/0280421 A1 | 10/2015 | Niwa et al. | |
| 2016/0257202 A1 | 9/2016 | Chatroux et al. | |
| 2017/0166075 A1 | 6/2017 | Hong et al. | |
| 2020/0161876 A1 | 5/2020 | Dawn et al. | |
| 2021/0249701 A1 | 8/2021 | Shine et al. | |
| 2021/0367422 A1 | 11/2021 | Li et al. | |
| 2022/0089031 A1 | 3/2022 | Nyström | |
| 2022/0123561 A1 | 4/2022 | Brunet et al. | |
| 2022/0352814 A1 | 11/2022 | Klintberg et al. | |
| 2023/0010942 A1* | 1/2023 | Burkell | H02J 7/0013 |

OTHER PUBLICATIONS

Extended European Search Report in corresponding European Application No. 22209895.6 dated May 22, 2023 (10 pages).

* cited by examiner

METHOD FOR OPERATING A SWITCHING ARRANGEMENT

TECHNICAL FIELD

The present invention relates to a method for operating a switching arrangement of an energy storage system of a vehicle. The invention further relates to a switching arrangement for an energy storage system in a vehicle.

The invention is applicable on vehicles, in particularly heavy vehicles, such as e.g. trucks. However, although the invention will mainly be described in relation to a truck, the method is also applicable for other types of vehicles, such as buses, passenger cars, industrial construction machines, wheel loaders, etcetera.

BACKGROUND

A vehicle typically comprises an engine for propelling the vehicle. The engine may be an internal combustion engine powered by e.g. liquid or gaseous fuel, or it may be an electric machine powered by electricity. Moreover, hybrid solutions exist in which the vehicle is propelled both by an internal combustion engine and an electric machine. In either way, an energy storage device is used to store the energy needed in order to propel the vehicle. Energy storage devices may further be used to power auxiliary loads in the vehicle.

For many vehicles, the energy storage devices are comprised in an energy storage system, wherein the energy storage system is configured to power the electric machine for propelling the vehicle, as well as any auxiliary load. For example, for an electric vehicle, the energy storage devices may be batteries or battery packs, which are configured to operate the electric machine as well as electrically driven auxiliary equipment. The electric machine and/or the electrically driven auxiliary equipment may be commonly referred to as a load. Several batteries, or several series-connected and/or parallel connected battery cells, may be grouped into the battery pack. The battery pack is periodically in need of charging, and is then electrically connected to an electrical energy source, e.g. via plug directly connected to the power grid, or by an on-board charger. Such chargers may commonly be referred to as a power source.

In many applications, several battery packs are included in the energy storage system by being parallelly connected to a common traction voltage bus (or common traction power bus). The load and/or power source is also connected to the common traction voltage bus. Hereby, the supplied power can be adapted based on the number of battery packs, and/or higher power requirements of the vehicle may be met. Typically, each battery pack is associated with a switch, or contactor, enabling connection and disconnection of the battery pack relative the common traction voltage bus and the load and/or power source. Thus, when a contactor is closed, the associated battery pack is connected to the common traction voltage bus and may power the load or receive charging power from the power source, and when a contactor is opened, the associated battery pack is disconnected from the common traction voltage bus. However, every time the state of a contactor is changed from closed to open, or vice versa, the contactor is subject to mechanical and electrical wear.

The electric wear of the contactor is typically higher than the mechanical wear, and thus more significant for determining the life length of the contactor. Electric wear may e.g. origin from inrush currents during connection of a battery pack to the common traction voltage bus, i.e. when closing the contactor.

Contactor wear as described above may lead to contactor failure. In particular, premature contactor failure of a single contactor is undesirable, as sometimes more than the failing contactor have to be replaced, which may be very expensive.

SUMMARY

It is an object of the present invention to at least to some extent alleviate the shortcomings discussed above in relation to known energy storage systems and battery packs, and to improve the operation of connecting the battery packs to a common traction voltage bus.

According to at least a first aspect of the present invention, a method for operating a switching arrangement of an energy storage system, the energy storage system comprising a common traction voltage bus and a plurality of parallelly arranged battery packs connectable to the common traction voltage bus, and the switching arrangement comprising an associated contactor for each battery pack, the contactors being configured to connect the battery packs to the common traction voltage bus by closing, and to disconnect the battery packs from the common traction voltage bus by opening, is provided. The method comprises:

identifying a non-connected battery pack to be connected to the common traction voltage bus, determining the voltage difference between the common traction voltage bus and the identified battery pack, adjusting the current of the common traction voltage bus to reduce the voltage difference between the common traction voltage bus and the identified battery pack, in response of the voltage difference between the common traction voltage bus and the identified battery pack being lower than a predetermined threshold value, closing the contactor associated with the identified battery pack to connect the identified battery pack to the common traction voltage bus.

Hereby, the contactor connecting the identified battery pack is subject to a lower contactor wear as the current, e.g. an inrush current or a continuous current, of the identified battery pack is reduced as the voltage difference between the common traction voltage bus and the identified battery pack is lower than the predetermined threshold value, as compared to closing the contactor at a voltage difference between the common traction voltage bus and the identified battery pack being higher than the predetermined threshold. It should be understood that the non-connected battery pack is identified as the battery pack to be connected to the common traction voltage bus next, and may simply be referred to as the identified battery pack. Thus, such identified battery pack will undergo a change from being a non-connected battery pack into being a connected battery pack as the associated contactor is closed. The step of adjusting the current of the common traction voltage bus typically comprises actively adjusting the current. By actively adjusting the current of the common traction voltage bus prior to closing of the associated contactor to the identified battery pack, the contactor may be closed quicker, or sooner, as compared to not actively adjusting the current, for the same level of contactor wear. According to at least one example embodiment, predetermined threshold value is between 3V-7V, e.g. 5V.

The harmful currents, or inrush currents, described above may be present in an energy storage system comprising a plurality of parallelly connected battery packs despite that all loads (or power sources) connected to the common traction voltage bus are shut off, or have been turned off, or are in the process of ramping down, due to currents flowing in response to a voltage difference between the common traction voltage bus and the identified battery packs (when being connected to the common traction voltage bus), i.e. a current flowing from already connected battery packs to battery packs being connected to the common traction voltage bus from a non-connected state. Such currents may be referred to as energy storage system internal currents, or multipack balancing currents. By actively adjusting the current of the common traction voltage bus, the voltage difference between the common traction voltage bus and the identified battery pack may be reduced, and the identified battery pack can be connected with a reduced contactor wear.

By reducing the contactor wear, the total life-length of the switching arrangement may be increased. Thus, excessive contactor wear of e.g. a single contactor, leading to contactor failure, as well as the overall contactor wear of the switching arrangement, may be reduced. The contactor wear may e.g. be due to the formation of electric arcs (arcing), and may be referred to as electric contactor wear. Such electric arcs may be formed moments before completely closing the contactor, and due to the voltage difference between the common traction voltage bus and the identified battery pack to be connected next.

The method is typically carried out in a state in which at least one battery pack of the energy storage system is already connected to the common traction voltage bus. Thus, the method may comprise the step of identifying a state in which at least one battery pack, e.g. a first battery pack, of the energy storage system is already connected to the common traction voltage bus, and subsequently perform the step of identifying a non-connected battery pack to be connected to the common traction voltage bus. Thus, both the already connected battery pack, and the non-connected battery pack, are battery packs of the energy storage system. By adjusting the current of the common traction voltage bus such that the voltage difference between the common traction voltage bus and the identified battery pack is reduced, the contactor wear associated with closing the contactor of the identified battery pack is reduced, as compared to not adjusting the current of the common traction voltage bus. By adjusting the current on the common traction voltage bus, the voltage of the battery packs already connected to the common traction voltage bus will change. During connection of the first battery pack to the common traction voltage bus (i.e. connecting a battery pack to the common traction voltage bus to which no battery pack is already connected), no inrush current is typically flowing from the common traction voltage bus to the associated contactor for the first battery pack, why no active adjustment of the current of the common traction voltage bus is needed when connecting the first battery pack to the common traction voltage bus. The method may comprise the step of connecting a first battery pack to the common traction voltage bus, wherein no battery pack is connected to the common traction voltage bus prior to connecting the first battery pack. Thus, the step of closing the contactor associated with the identified battery pack to connect the identified battery pack to the common traction voltage bus is performed when the first battery pack is already connected to the common traction voltage bus. That is, and according to at least one example embodiment, at least one battery pack is connected to the common traction voltage bus during the connection of the identified battery pack to the common traction voltage bus, wherein the already connected battery pack is another battery pack than the identified battery pack.

The method may comprise alternately connecting and disconnecting the battery packs of the energy storage system to and from the common traction voltage bus, wherein the steps of connecting the battery packs to the common traction voltage bus subsequently to connecting the first battery pack to the common traction voltage bus include adjusting the current of the common traction voltage to reduce the voltage difference between the common traction voltage bus and the battery pack to be connected next in time (i.e. the identified battery pack) as previously described, typically until all of the battery packs in the energy storage system are connected.

According to at least one example embodiment, the method comprises connecting at least two of the battery packs in the energy storage system to the common traction voltage bus (e.g. subsequently to connecting a first battery pack to the common traction voltage bus with or without adjusting the current of the common traction voltage to reduce the voltage difference between the common traction voltage bus and the first battery pack), wherein adjusting the current of the common traction voltage to reduce the voltage difference between the common traction voltage bus and the battery pack to be connected next in time (i.e. the identified battery pack) is performed as previously described for each one of the at least two battery packs. Thus, and according to one example, a second battery pack is identified as the battery pack to be connected next to the common traction voltage bus (e.g. subsequently to connecting the first battery pack), the voltage difference between the common traction voltage bus and the identified second battery pack is determined, the current of the common traction voltage bus is adjusted to reduce the voltage difference between the common traction voltage bus and the identified second battery pack, and in response of that the voltage difference between the common traction voltage bus and the identified second battery pack is lower than the predetermined threshold value, the contactor associated with the identified second battery pack is closed to connect the identified second battery pack to the common traction voltage bus, whereafter subsequently to connecting the second battery pack, a third battery pack is identified as the battery pack to be connected next to the common traction voltage bus, the voltage difference between the common traction voltage bus and the identified third battery pack is determined, the current of the common traction voltage bus is adjusted to reduce the voltage difference between the common traction voltage bus and the identified third battery pack, and in response of that the voltage difference between the common traction voltage bus and the identified third battery pack is lower than the predetermined threshold value, the contactor associated with the identified third battery pack is closed to connect the identified second battery pack to the common traction voltage bus. This procedure may be performed until all of the battery packs in the energy storage system is connected. For example, if the energy storage system comprises six battery packs, the procedure of adjusting the current of the common traction voltage to reduce the voltage difference between the common traction voltage bus and the battery pack to be connected next in time, is performed prior to connecting the next battery pack for all of the six battery packs, or at least for the five battery packs being connected subsequently to connecting the first battery pack, as previously described.

It should be understood that the step of determining the voltage difference between the common traction voltage bus and the identified battery pack may comprise a step of measuring (or determining) such voltage difference, prior to, or after, identifying the battery pack to be connected next. That is, the step of determining the voltage difference between the common traction voltage bus and the identified battery pack, or the voltage difference between the common traction voltage bus and each one of the non-connected battery packs, may be performed as a first step, whereafter the battery pack to be connected next in time to the common traction voltage bus is determined in response to the step of determining the voltage difference between the common traction voltage bus and each one of the non-connected battery packs. For example, the battery pack to be connected next in time to the common traction voltage bus may be determined to be the battery pack having the lowest voltage difference to the common traction voltage bus among the non-connected battery packs. As an alternative, the step of identifying the battery pack to be connected next in time to the common traction voltage bus is performed as a first step, whereafter the voltage difference between the common traction voltage bus and the identified battery pack is measured or determined. For example, the battery pack to be connected next in time to the common traction voltage bus may be determined to be the battery pack having a specific position in the energy storage system, or being associated with a specific number. For example, each battery pack in the energy storage system is associated with a predetermined individual number, and the method comprises connecting the battery packs to the common traction voltage bus in the predetermined numbered order. According to one example, the order of connecting the battery packs to the common traction voltage bus is independent of (i.e. not determined in response to) differences, such as voltage differences or differences in state of charge between the battery packs. The order may furthermore be independent of differences in charge capacities between the battery packs, differences in electric currents conducted through the battery packs or differences in polarities of the electric currents conducted through the battery packs.

According to at least one example embodiment, said associated contactor for each battery pack of the switching arrangement is referred to as a main contactor, wherein the switching arrangement further comprises a secondary contactor for each one of the battery packs. According to at least one example embodiment, each secondary contactor is arranged on an opposite side of the battery pack as compared to the corresponding main contactor. Stated differently, the main contactors may be arranged at the positive terminal side of the battery packs and may thus be referred to as positive contactors, and the secondary contactors may be arranged at the negative terminal side of the battery packs and may thus be referred to as negative contactors. The secondary contactors may e.g. be provided for redundancy of the main contactors, and may according to at least one example embodiment be arranged on the same side of the battery pack as the corresponding main contactor (e.g. arranged in series with the corresponding main contactor).

According to at least one example embodiment, each battery pack comprises a plurality of series-connected battery cells. The battery cells may be clustered into battery modules, wherein each battery pack comprises a plurality of series-connected battery modules.

According to at least one example embodiment, the method further comprises:
    determining that the common traction voltage bus is at a higher voltage than the identified battery pack,
    wherein the step of adjusting the current is achieved by a discharging current of the common traction voltage bus.

By the discharging current, the battery pack(s) already connected to the common traction voltage bus is discharged, and the voltage difference between the common traction voltage bus and the identified battery pack may be brought lower than the predetermined threshold value.

According to at least one example embodiment, the step of adjusting the current by a discharging current of the common traction voltage bus is performed for a predetermined time interval, e.g. during 5 ms to 300 ms, or during 5 ms to 3000 ms. During this predetermined time interval, the voltage difference between the common traction voltage bus and the identified battery pack may be brought to be lower than the predetermined threshold value by the discharging current, and the contactor associated with the identified battery pack may be closed to connect the identified battery pack to the common traction voltage bus. Moreover, such predetermined time interval results in a low loss, as the discharging current is only provided for a relatively short time.

According to at least one example embodiment, the method further comprises:
    determining that the common traction voltage bus is at a lower voltage than the identified battery pack,
    wherein the step of adjusting the current is achieved by a charging current of the common traction voltage bus.

By the charging current, the battery pack(s) already connected to the common traction voltage bus is charged, and the voltage difference between the common traction voltage bus and the identified battery pack may be brought lower than the predetermined threshold value.

According to at least one example embodiment, the step of adjusting the current by a charging current of the common traction voltage bus is performed for a predetermined time interval, e.g. during 5 ms to 300 ms, or during 5 ms to 3000 ms. During this predetermined time interval, the voltage difference between the common traction voltage bus and the identified battery pack may be brought to be lower than the predetermined threshold value by the charging current, and the contactor associated with the identified battery pack may be closed to connect the identified battery pack to the common traction voltage bus. Moreover, such predetermined time interval results in a low charge, as the charging current is only provided for a relatively short time.

According to at least one example embodiment, the two previously described embodiments may be combined, and the method thus comprising:
    determining whether that the common traction voltage bus is at a higher or a lower voltage than the identified battery pack,
    in response to that that the common traction voltage bus is at a lower voltage than the identified battery pack, adjusting the current by a charging current of the common traction voltage bus, and in response to that the common traction voltage bus is at a higher voltage than the identified battery pack, adjusting the current by a discharging current of the common traction voltage bus.

According to at least one example embodiment, the step of adjusting the current of the common traction voltage bus to reduce the voltage difference between the common traction voltage bus and the identified battery pack (e.g. by a charging or discharging current of the common traction voltage bus) is performed for a predetermined time interval, e.g. during 5 ms to 300 ms, or during 5 ms to 3000 ms.

According to at least one example embodiment, the step of adjusting the current is performed in response to the determined voltage difference between the common traction voltage bus and the identified battery pack being higher than the predetermined threshold value.

Thus, in case the voltage difference between the common traction voltage bus and the identified battery pack is higher than the predetermined threshold value, the step of adjusting the current of the common traction voltage bus to reduce the voltage difference between the common traction voltage bus and the identified battery pack is performed. In case the voltage difference between the common traction voltage bus and the identified battery pack is lower than the predetermined threshold value, no such step of adjusting the current of the common traction voltage bus needs to be performed.

According to at least one example embodiment, the switching arrangement comprises a control unit configured to receive battery current and battery voltage for each one of the battery packs in the energy storage system.

Current of a battery pack may in general refer to current in (positive) or current out (negative) of the battery pack. The battery current may be measured current, typically referring to the absolute value of the measured current or the modulus of the measured value of the current. The battery voltage may be measured voltage, typically the absolute value of the measured voltage difference between the positive and negative terminals of the corresponding battery pack.

Moreover, the control unit may be configured to receive, or determine, various battery pack data of the plurality battery packs, such as e.g. State-of-Charge (SoC), State-of-Health (SoH), etcetera.

According to at least one example embodiment, the method further comprises:
 in response to the received battery current and battery voltage of each one of the battery packs, evaluating a plurality of non-connected battery packs, wherein the step of identifying the non-connected battery pack to be connected to the common traction voltage bus is performed in response to such evaluation.

Thus, by evaluating the received battery current and battery voltage of each one of the battery packs, or at least of the plurality of non-connected battery packs, the battery pack to be connected next time (i.e. the identified battery pack) can be chosen accordingly. For example, if connection of one of the non-connected battery pack results in a lower adjustment of the current of the common traction voltage bus (or no adjustment as the voltage difference between the common traction voltage bus and such non-connected battery pack is already lower than the predetermined threshold value) as compared to another one of the non-connected battery packs, such battery pack may be identified as the battery pack to be connected to the common traction voltage bus next in time.

According to at least one example embodiment, and for the embodiment in which a discharging current is used to adjust the current of the common traction voltage bus, a plurality of non-connected battery packs is connected in an order from the highest to lowest battery voltage. That is, according to such embodiment, the identified battery pack (to be connected next in time) is the battery pack of the plurality of non-connected battery packs having the highest battery voltage.

According to at least one example embodiment, the method further comprises: in response to the battery pack data of the plurality battery packs, evaluating a plurality of non-connected battery packs, wherein the step of identifying the non-connected battery pack to be connected to the common traction voltage bus is performed in response to such evaluation.

For example, the non-connected battery pack having the lowest SoC or SoH may be disregarded as being the identified battery pack to be connected next. Moreover, if a certain battery pack has been determined to be malfunctioning, such battery pack may typically be disregarded as being the identified battery pack to be connected next. For example, the method may comprise identifying a predefined error in a battery pack of the plurality of battery packs, the predefined error being included in a group of predefined errors, and in response to identifying the predefined error, disregarding such battery pack as being the identified battery pack to be connected next.

According to at least one example embodiment, the common traction voltage bus is connected to a power apparatus being a load and/or a power source.

That is, a load connected to the common traction voltage bus may be powered by the battery pack(s) connected to the common traction voltage bus. Correspondingly, a power source connected to the common traction voltage bus may provide power to the battery packs(s) connected to the common traction voltage bus. The common traction voltage bus may be a shared bus for both the load and the power source of the vehicle.

According to at least one example embodiment, the power apparatus is a controllable load and/or a controllable power source.

Thus, the power apparatus may be controlled to adjust the current of the common traction voltage bus. That is, the power apparatus may be used to reduce the voltage difference between the common traction voltage bus and the identified battery pack, as previously described. Stated differently, and according to at least one example embodiment, the step of adjusting the current on the common traction voltage bus is performed by controlling the operation of the power apparatus. The previously described discharging current may e.g. be achieved by the controllable load, and the previously describing charging current may e.g. be achieved by the controllable power source.

According to at least one example embodiment, the power apparatus is a load being a motor and/or an inverter, or the power apparatus is a power source being an external charger, an on-board charger or a fuel cell. For example, the step of adjusting the current on the common traction voltage bus by controlling the operation of the power apparatus may imply that the power apparatus is operated in 0% efficiency control. Thus, the current on the common traction voltage bus may be controlled by the motor and/or inverter without moving the motor mechanically. However, a load or power source, such as a 24V DCDC converter may still be operating by current on the traction voltage bus.

Thus, the power apparatus being a load and/or a power source may be an external power source, e.g. an external charger connected to the grid.

According to at least one example embodiment, the power apparatus is an on-board charger, a fuel cell, or an electric machine. For example, an electric machine may be operated as an electric motor consuming electricity provided by the battery packs (i.e. the battery packs connected to the common traction voltage bus powers the electric motor) e.g. to provide propulsion power, and may be operated as a generator to generate electricity to charge the battery packs (i.e. the battery packs connected to the common traction voltage bus are powered by the generator). Thus, the electric machine is an example of a power apparatus being a load and/or a power source. Thus, the power apparatus may be a load, a power source or a combined load/power source. For example, the power apparatus may be a combination of an uncontrollable load and controllable charger. According to at least one example embodiment, the power apparatus is a brake resistor, or a heater.

Any such loads and/or power source may easily be controlled to adjust the current on the common traction voltage bus.

According to at least one example embodiment, the step of determining the voltage difference between the common traction voltage bus and the identified battery pack is performed during a no power operation of the power apparatus.

For example, the power apparatus is the traction electric machine or on-board charger of the vehicle. Thus, the step of determining the voltage difference between the common traction voltage bus and the identified battery pack is performed during a no power operation of the traction electric machine or on-board charger of the vehicle. The no power operation of the power apparatus may correspond to that the power apparatus is shut off. For a load, that implies no consumption of electricity provided by the battery packs connected to the common traction voltage bus, e.g. no output torque of the electric machine, and for a power source, that implies no generation of electricity to charge the battery packs connected to the common traction voltage bus. However, the step of determining the voltage difference between the common traction voltage bus and the identified battery pack may be performed while the vehicle is operating, e.g. while driving the vehicle (i.e. when the vehicle is temporary free-wheeling, e.g. when reducing torque while changing gears).

By adjusting the current on the common traction voltage bus, the current to the identified battery pack from the common traction voltage bus can be reduced as the identified battery pack is connected to the common traction voltage bus, as previously described. Thus, an efficient means for adjusting the current on the common traction voltage bus is provided. That is, the power apparatus may be a controllable power apparatus and may be operated to depart from its shut-off state in order to adjust the current on the common traction voltage bus. The adjustment of current may e.g. be based on an induced variance of internal resistance.

According to at least one example embodiment, the step of determining the voltage difference between the common traction voltage bus and the identified battery pack is performed during a power ramping down operation of the power apparatus.

According to at least one example embodiment, the step of determining the voltage difference between the common traction voltage bus and the identified battery pack is performed when all loads or power sources connected to the common traction voltage bus are in a no power operation. This may be referred to as a no load power of the load and a non-charging event of the power source.

According to at least one example embodiment, the method further comprises the step of closing the contactor associated with the last non-connected battery pack, such that all battery packs of the energy storage system are connected to the common traction voltage bus.

Hereby, all of the battery packs may be connected to the common traction voltage bus in an efficient manner. The previously described method of connecting a battery pack may be implemented for each one of the battery packs, or at least each one of the battery packs subsequently to connecting the first battery pack to the common traction voltage bus, such that the current of the common traction voltage bus to is adjusted to reduce the voltage difference between the common traction voltage bus and the battery packs to be connected next (i.e. the identified battery packs) for each time a battery pack is connected.

According to at least one example embodiment, the voltage difference between the common traction voltage bus and the identified battery pack is determined continuously.

According to at least one example embodiment, each one of the battery packs is controlled by the control unit, and the determined or measured battery current and battery voltage of the battery packs are provided continuously to the control unit. Moreover, the control unit may receive other various battery pack data of the plurality battery packs, such as e.g. State-of-Charge (SoC), State-of-Health (SoH), etcetera. Thereafter, the control unit identifies a non-connected battery pack to be connected next to the common traction voltage bus. The control unit may identify such battery pack based on a decision algorithm. For example, the decision algorithm may be configured to identify the battery pack to be connected next based on the battery voltage (or SoC) of the non-connected battery pack(s). Subsequently, the control unit may initiate a discharging current on the common traction voltage bus, e.g. by controlling a controllable power apparatus, e.g. a motor/inverter via a CAN communication. In such example, the motor/inverter is operated in 0% efficiency control (i.e. no undesired output torque is achieved). This is typically performed in response to that that the voltage difference between the common traction voltage bus and the identified battery pack is higher than a predetermined threshold value. Thereafter, the control unit sends instructions to the associated contactor of the identified battery pack to close. Such action is typically performed in response to that the voltage difference between the common traction voltage bus and the identified battery pack is lower than a predetermined threshold.

According to at least a second aspect of the present invention, a switching arrangement for an energy storage system in a vehicle, the energy storage system comprising a common traction voltage bus and a plurality of parallelly arranged battery packs connectable to the common traction voltage bus, is provided. The switching arrangement comprises:
  an associated contactor for each battery pack, the contactors being configured to connect the battery packs to the common traction voltage bus by closing, and to disconnect the battery packs from the common traction voltage bus by opening,
  a control unit configured to:
    identify a non-connected battery pack to be connected to the common traction voltage bus,
    determine the voltage difference between the common traction voltage bus and the identified battery pack,
    adjust the current of the common traction voltage bus to reduce the voltage difference between the common traction voltage bus and the identified battery pack,
    in response of the voltage difference between the common traction voltage bus and the identified battery pack being lower than a predetermined threshold value, close the contactor associated with the identified battery pack to connect the battery pack to the common traction voltage bus.

Effects and features of the second aspect of the invention are largely analogous to those described above in connection with the first aspect of the invention. Embodiments mentioned in relation to the first aspect of the invention are largely compatible with the second aspect of the invention, of which some are exemplified below.

For example, the connection of the identified battery pack is typically carried out in a state in which at least one battery pack of the energy storage system is already connected to the common traction voltage bus. Thus, the control unit may be configured to identify, or receive information of, a state in which at least one battery pack of the energy storage system is already connected to the common traction voltage bus.

The control unit of the switching arrangement may be configured to connect the battery packs to the common traction voltage bus by means of the contactors, and to disconnect the battery pack from the traction voltage bus by means of the contactors. Moreover, the control unit may alternately connect and disconnect the battery packs to and from the common traction voltage bus, wherein, during connections, the control unit is configured to adjust the current of the common traction voltage bus prior to connecting an identified battery pack (to be connected next) as previously described.

According to at least one example embodiment, the control unit is configured to adjust the current on the common traction voltage bus by controlling the operation of a power apparatus connected to the common traction voltage bus.

Thus, the power apparatus may be controllable load and/or a controllable power source, which the control unit can control to adjust the current on the common traction voltage bus.

According to a third aspect of the present invention, a vehicle is provided. The vehicle comprises a switching arrangement according the second aspect of the invention. Moreover, the vehicle typically comprises an energy storage system as previously described.

According a fourth aspect of the present invention, a computer program is provided. The computer program comprises program code means for performing the method of the first aspect of the invention, when the program is run on a computer.

Such computer program may e.g. be implemented in an ECU of the vehicle, or e.g. be comprised in the previously described control unit of the switching arrangement.

Thus, it should be understood that the method of the first aspect of the invention may be referred to as a computer-implemented method for operating a switching arrangement of an energy storage system of a vehicle.

According to a fifth aspect of the present invention, a computer readable medium carrying a computer program comprising program code means for performing the method of the first aspect of the invention, when the program product is run on a computer, is provided.

Effects and features of the third to fifth aspects of the invention are largely analogous to those described above in connection with the first and second aspects of the invention. Embodiments mentioned in relation to the first and second aspects of the invention are largely compatible with the third to fifth aspects of the invention.

According to at least one example embodiment, applicable to any one of the first to fifth aspects of the invention, the battery packs are adapted for a vehicle, such as e.g. a heavy duty truck. As the battery packs of the energy storage system are parallelly arranged, the contactors of the switching arrangement may be referred to as being parallelly arranged. That is, at least the contactors used for disconnecting the battery packs from the power apparatus may be referred to as being parallelly arranged.

According to at least one example embodiment, the term disconnecting may be referred to as electrically disconnecting, and the term connecting may be referred to as electrically connecting.

According to at least one example embodiment, the plurality of parallelly arranged battery packs is at least two, or at least three parallelly arranged battery packs. Thus, the switching arrangement comprises a plurality of parallelly arranged contactors, wherein each contactor is capable of connecting and disconnecting an associated battery pack. The plurality of parallelly arranged contactor is at least two, or at least three parallelly arranged contactors.

The control unit may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device. Even though only one (common) control unit has been described in the present application, it is to be understood that the control unit may be divided into several sub-units, e.g. each battery pack may be associated with a corresponding sub-unit. Moreover, a master control unit may be associated with the switching arrangement or energy storage system, and configured to communicate with the sub-units, e.g. each sub-unit of the battery packs.

Further advantages and features of the present invention are disclosed and discussed in the following description and the accompanying drawings.

BRIEF DESCRIPTION OF THE DRAWINGS

With reference to the appended drawings, below follows a more detailed description of embodiments of the invention cited as examples. In the drawings.

DETAILED DESCRIPTION OF EXAMPLE EMBODIMENTS OF THE INVENTION

Figure 1:
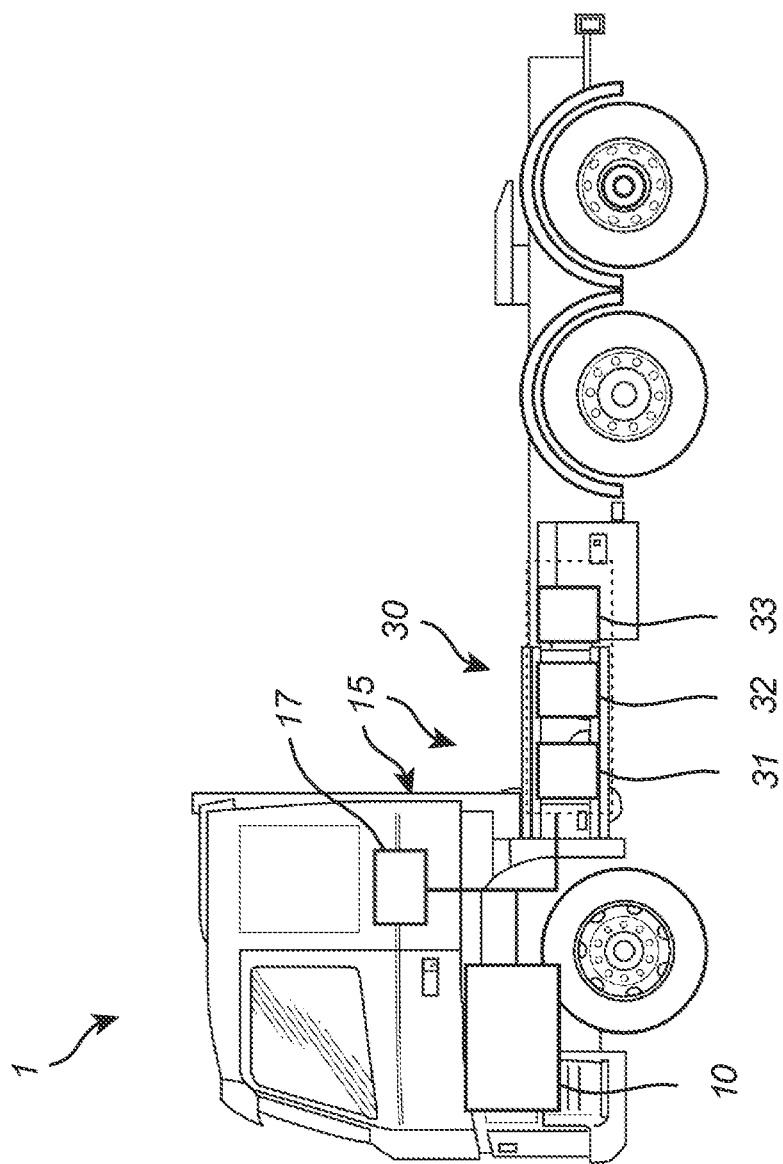
FIG. 1 is a schematic side view of a vehicle comprising a switching arrangement and an energy storage system, in accordance with example embodiments of the invention.

With reference to FIG. 1, a vehicle 1, here embodied as a heavy duty truck 1, is disclosed for which a method, a switching arrangement 15, and/or an energy storage system 30 of a kind disclosed in the present invention is advantageous. However, the method, the switching arrangement 15 or the energy storage system 30 may as well be implemented in other types of vehicles, such as in busses, light-weight trucks, passenger cars, marine applications etcetera. The vehicle 1 is an electric vehicle, such as a full electric vehicle or a hybrid, comprising at least one electric machine 10 powered by the energy storage system 30, wherein in the example of FIG. 1, the energy storage system comprises three energy storage devices 31, 32, 33, or battery packs 31, 32, 33. The switching arrangement 15 is configured to connect and disconnect the battery packs 31, 32, 33 relative a common traction voltage bus being connected to the electric machine 10. Moreover, the switching arrangement 15 comprises a control unit 17 arranged and configured for controlling at least the operation of the switching arrangement 15. The vehicle 1 typically further comprises other parts of the powertrain such as transmission, drive shafts and wheels (not shown in detail). The electric machine 10 may be operated as an electric motor consuming electricity provided by the battery packs 31, 32, 33, e.g. to provide propulsion power, and may be operated as a generator to generate electricity to charge the battery packs 31, 32, 33. Thus, the electric machine 10 is an example of a power apparatus being a load and/or a power source.

Figure 2:
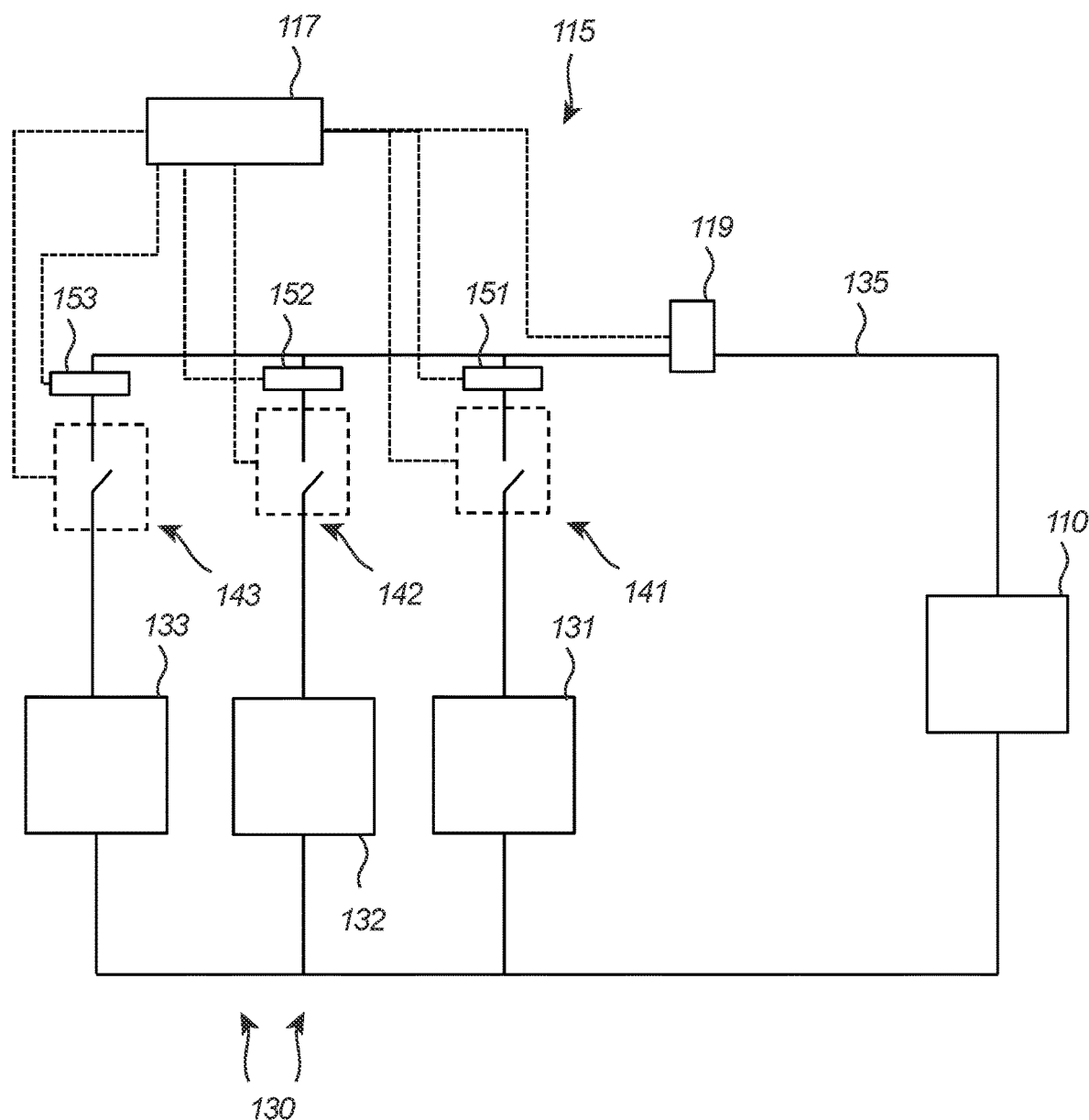
FIG. 2 is a schematic view of a switching arrangement for energy storage system having a plurality of battery packs arranged in parallel for powering a load, in accordance with an example embodiment of the invention.

FIG. 2 is a schematic view of a switching arrangement 115 and an energy storage system 130 having a plurality of battery packs 131, 132, 133 arranged in parallel for connection to a power apparatus 110 via a common traction voltage bus 135. The embodiment shown in FIG. 2 may be implemented in the vehicle 1 of FIG. 1, and thus the switching arrangement 115, the energy storage system 130 and the power apparatus 110 of FIG. 2, may correspond to the switching arrangement 15, the energy storage system 30 and the electric machine 10 of FIG. 1.

The energy storage system 130 comprises a first battery pack 131, a second battery pack 132 and a third battery pack 133, but it should be noted that any number of battery packs equal to, or higher than, two may be included in the energy storage system 130. The switching arrangement 115 comprises an associated contactor 141, 142, 143 for each battery pack 131, 132, 133. Thus, in more detail, the switching arrangement 115 comprises a first contactor 141 configured to connect and disconnect the first battery pack 131 to and from to the common traction voltage bus 135 by closing and opening, respectively, and comprises a second contactor 142 configured to connect and disconnect the second battery pack 132 to and from the common traction voltage bus 135 by closing and opening, respectively, and comprising a third contactor 143 configured to connect and disconnect the third battery pack 133 to and from the common traction voltage bus 135 by closing and opening, respectively. Thus, an associated contactor, here being the first, second and third contactors 141, 142, 143, is provided for each battery pack, here being the corresponding first, second and third battery packs 131, 132, 133.

As shown in FIG. 2, the first, the second and third battery packs 131, 132, 133 may be connected to the power apparatus 110 via the common traction voltage bus 135 (which may also be referred to as a common traction power bus). Thus, the common traction voltage bus 135 is arranged between the first, second and third contactors 141, 142, 143 and the power apparatus 110. The first contactor 141, and the corresponding first battery pack 131, are arranged adjacent the power apparatus 110, while the third contactor 143, and the corresponding third battery pack 133, are arranged furthest away from the power apparatus 110, while the second contactor 142, and the corresponding second battery pack 132, are arranged between the first and third contactors 141, 143. The power apparatus 110 may be powered by all, or any one, of the first, second and third battery packs 131, 132, 133 by closing the corresponding first, second and third contactors 141, 142, 143 (i.e. by connecting the first, second and third battery packs 131, 132, 133 to the common traction voltage bus 135, and hence the power apparatus 110) in case the power apparatus 110 is a load. Correspondingly, the power apparatus 110 may charge all, or any one, of the first, second and third battery packs 131, 132, 133 by closing the corresponding first, second and third contactors 141, 142, 143 (i.e. by connecting the first, second and third battery packs 131, 132, 133 to the common traction voltage bus 135, and hence the power apparatus 110) in case the power apparatus 110 is a power source.

Any one of, or all of, the first, second and third battery packs 131, 132, 133 may be connected to the common traction power bus 135 by closing the corresponding the first, second and third contactors 141, 142, 143. The switching arrangement 115 comprises a control unit 117 configured to control the operation of at least the switching arrangement 115, which is further described with reference to the flow chart of FIG. 3. The switching arrangement 115 is, via the control unit 117, configured to connect the first, second and third battery packs 131, 132, 133 to the common traction voltage bus 135 and the power apparatus 110 by means of the first, second and third contactors 141, 142, 143, respectively, such that the first, second and third battery packs 131, 132, 133 are connected in a sequence in which one contactor, e.g. the first contactor 141, is closed first, thereafter another contactor is closed, e.g. the second contactor 142, and finally the last contactor is closed, e.g. the third contactor 143.

For example, in a first state, being a partly connected state, one of the first, second and third contactors 141, 142, 143 is closed and the corresponding first, second or third battery pack 131, 132, 133 is connected to the common traction power bus 135 (e.g. for powering the power apparatus 110, or for being charged by the power apparatus 110). For example, the third contactor 143 is closed and the third battery pack 133 is connected to the common traction power bus 135, while the first and second contactors 141, 142 are opened, and the first and second battery packs 131, 132 are non-connected (or disconnected) relative to the common traction power bus 135. In a second state, being a connection state, one or two of the first, second and third contactors 141, 142, 143 are closed to connect the corresponding first, second and/or third battery pack 131, 132, 133 to the common traction voltage bus 135. According to the above example, the first contactor 141 and/or the second contactor 142 are closed and the corresponding first and/or second battery pack 131, 132 are subsequently connected to the common traction power bus 135. For example, first the second contactor 142 is closed to connect the second battery pack 132 to the common traction voltage bus 135 such that both the second and third battery packs 132, 133 are connected to the common traction voltage bus 135. Thereafter, the first contactor 131 is closed to connect the first battery pack 131 to the common traction voltage bus 135 such that all of the battery packs 131, 132, 133 of the energy storage system 130 is connected to the common traction voltage bus 135.

In a scenario in which the power apparatus 110 is operated in a no power operation (e.g. by being shut off, but not disconnected from all of the battery packs 131, 132, 133), or is ramping down, energy storage system internal currents may still be flowing from the battery packs connected by the common traction voltage bus 135 to a battery pack being connected to the common traction voltage bus 135. Such energy storage system internal currents may be large enough to cause damage to the contactors 141, 142, 143 (i.e. contactor wear) upon contactor closing and connection of the corresponding battery pack 131, 132, 133 to the common traction voltage bus 135. For example, in case the second and third battery packs 132, 133 of the embodiment in FIG. 2 are connected to the common traction voltage bus 135, an energy storage system internal current may flow from the second and third battery packs 132, 133, via the common traction voltage bus 135, to the first battery pack 131 upon closing the first contactor 141. Thus, closing the first contactor 141 will result in contactor wear due to the present inrush current to the first battery pack 131.

The control unit 117 may be further configured to detect, and measure, the current, voltage and/or another type of battery pack data, by means of a first sensor 151 for the first battery pack 131, a second sensor 152 for the second battery pack 132 and a third sensor 153 for the third battery pack 133. The first, second and third sensors 151, 152, 153 are for example configured to detect the previously described energy storage system internal currents. Moreover, the control unit 117 may be configured to detect, and measure the current and voltage at the common traction bus 135 by means of a fourth sensor 119. Hereby, the voltage difference between the common traction voltage bus 135 and each non-connected battery pack 131, 132, 133 may be determined. For example, if the third contactor 143 is closed and the third battery pack 133 is connected to the common traction voltage bus 135, while the first and second contactors 142, 143 are opened, the control unit 117 can determine the voltage difference between the common traction voltage bus 135 and each one of the first and second battery packs 131, 132. Moreover, the control unit 117 may receive any battery pack data measurable from the sensors 151, 152, 153 and thereby determine e.g. State-of-Charge (SoC), State-of-Health (SoH), etcetera, or identify a predefined error in any one of the battery packs 131, 132, 133.

The switching arrangement 115 is, via the control unit 117, is configured to identify a non-connected battery pack, e.g. the first or second battery pack 131, 132 in the example above, to be connected next to the common traction voltage bus 135. This decision is typically made by the control unit 117 in the previously mentioned first state (partly connected state) in which the third battery pack 133 is already connected to the common traction voltage bus 135. As previously described, the control unit 117 is configured to determine the voltage difference between the common traction voltage bus 135 and the two non-connected battery packs 131, 132, by the first, second and fourth sensors 151, 152, 119. For example, if the voltage difference between the common traction voltage bus 135 and the first battery pack 131 is smaller than the voltage difference between the common traction voltage bus 135 and the second battery pack 132, the first battery pack may be identified as the non-connected battery pack to be connected next in time to the common traction voltage bus 135. Thus, the control unit 117 may be configured to evaluate the non-connected battery packs, 131, 132, and in response to such evaluation, identify the non-connected battery pack to be connected to the common traction voltage bus 135. In the following example, the identified battery pack is thus the first battery pack 131.

The control unit 117 may furthermore be configured to compare the voltage difference between the common traction voltage bus 135 and the identified battery pack 131 with a predetermined threshold value, and in response to the voltage difference being higher than the predetermined threshold value, to adjust the current of the common traction voltage bus 135 to reduce the voltage difference between the common traction voltage bus 135 and the identified battery pack 131. This may e.g. be achieved by that the control unit 117 controls the power apparatus 110, and adjusts the current on the common traction voltage bus 135 by controlling the operation of the power apparatus 110. For example, the control unit 117 may be configured to adjust the current on the common traction voltage bus 135 by requesting the power apparatus 110 to provide a discharging current on the common traction voltage bus 135 (typically, the power apparatus 110 is then a load). Additionally, the control unit 117 may be configured to adjust the current on the common traction voltage bus 135 by requesting the power apparatus 110 to provide a charging current on the common traction voltage bus 135 (typically, the power apparatus 110 is then a power source).

The control unit 117 may furthermore be configured to, in response of the voltage difference between the common traction voltage bus 135 and the identified battery pack 131 being lower than the predetermined threshold value, close the contactor associated with the identified battery pack 131, here being the first contactor 141, to disconnect the first battery pack from 131 the common traction voltage bus 135. Thus, by adjusting the current on the common traction voltage bus 135, e.g. by controlling the operation of the power apparatus 110, the inrush current of the first battery pack 131 upon connection to the common traction voltage bus 135 may be reduced, and the first contactor 141 can be closed with a reduced contactor wear as compared to closing the first contactor 141 without adjusting the current on the common traction voltage bus 135.

If the battery voltage of the identified battery pack 131 is higher than that of the common traction voltage bus 135, the adjustment of the current on the common traction voltage bus 135 is typically performed by a discharging current to reduce the battery voltage of the battery pack(s) already connected to the common traction voltage bus 135 (as e.g. the third battery pack 133). However, if the battery voltage of the identified battery pack 131 is lower than that of the common traction voltage bus 135, the adjustment of the current on the common traction voltage bus 135 is typically performed by a charging current to increase the battery voltage of the battery pack(s) already connected to the common traction voltage bus 135 (as e.g. the third battery pack 133).

Thus, the control unit 117 may be configured to determine that the common traction voltage bus 135 is at a higher or lower voltage than the identified battery pack 131, and to perform the step of adjusting the current of the common traction voltage bus by a discharging current and a charging current, respectively.

The control unit 117 may furthermore be configured to control the sequence in which the non-connected battery packs are connected. Thus, after connecting the first battery pack 131 as described above (i.e. to a common traction voltage bus 135 to which the third battery pack 133 is already connected), the same procedure may be performed in order to connect the second battery pack 132. During connection of the second battery pack from the common traction voltage bus 135, here being the last battery pack of the plurality of battery packs 131, 132, 133 of the energy storage system 130 (i.e. such that all battery packs 131, 132, 133 of the energy storage system 130 are connected to the common traction voltage bus 135 and the power apparatus 110), the same procedure as for connecting the first battery pack 131 is performed, except for the evaluation of the non-connected battery packs 131, 132 and the step of identifying the non-connected battery pack to be connected to the common traction voltage bus 135 in response to such evaluation (as the second battery pack 132 is the last battery pack to be connected). However, if connection of the second battery pack 132 to the common traction voltage bus 135 for some reason is not preferred, e.g. due to the identification of a too low SoH (i.e. SoH below a predetermined SoH threshold) or detection of a predefined error, the second battery pack 132 may be disregarded as being the identified battery pack to be connected next (the second battery pack 132 may remain un-connected to the common traction voltage bus 135 until it is fixed, or is replaced).

The switching arrangement 115 may, via the control unit 117, further be configured to disconnect any one of, or all of, the first, second and third battery packs 131, 132, 133 by means of the first, second and third contactors 141, 142, 143, respectively, from the common traction voltage bus 135 and the power apparatus 110. Thus, between subsequent connections of the battery packs 131, 132, 133, the battery packs 131, 132, 133 may be disconnected from the common traction voltage bus 135. The switching arrangement 115 may, via the control unit 117, be further configured to alternately connect and disconnect the first, second and third battery packs 131, 132, 133, to and from the common traction voltage bus 135, wherein, during connections to the common traction voltage bus 135, the switching arrangement 115 is configured to control the sequence in which the first, second and third battery packs 131, 132, 133 are connected to the common traction voltage bus 135 as previously described.

It should be mentioned that the switching arrangement may further comprise a first pre-charging contactor arranged in parallel to the first contactor 141, wherein the first pre-charging contactor is arranged in series with a first pre-charging resistor, and comprise a second pre-charging contactor arranged in parallel to the second contactor 142, wherein the second pre-charging contactor is arranged in series with a second pre-charging resistor, and comprise a third pre-charging contactor arranged in parallel to the third contactor 143, wherein the third pre-charging contactor is arranged in series with a third pre-charging resistor. Moreover, the first battery pack 131 may be connected in series with a first secondary contactor, arranged on the same or opposite side of the first battery pack 131 as compared to the first contactor 141. Correspondingly, the second battery pack 132 may be connected in series with a second secondary contactor arranged on the same or opposite side of the second battery pack 132 as compared to the second contactor 142, and the third battery pack 133 may be connected in series with a third secondary contactor arranged on the same or opposite side of the third battery pack 133 as compared to the third contactor 143.

Figure 3:
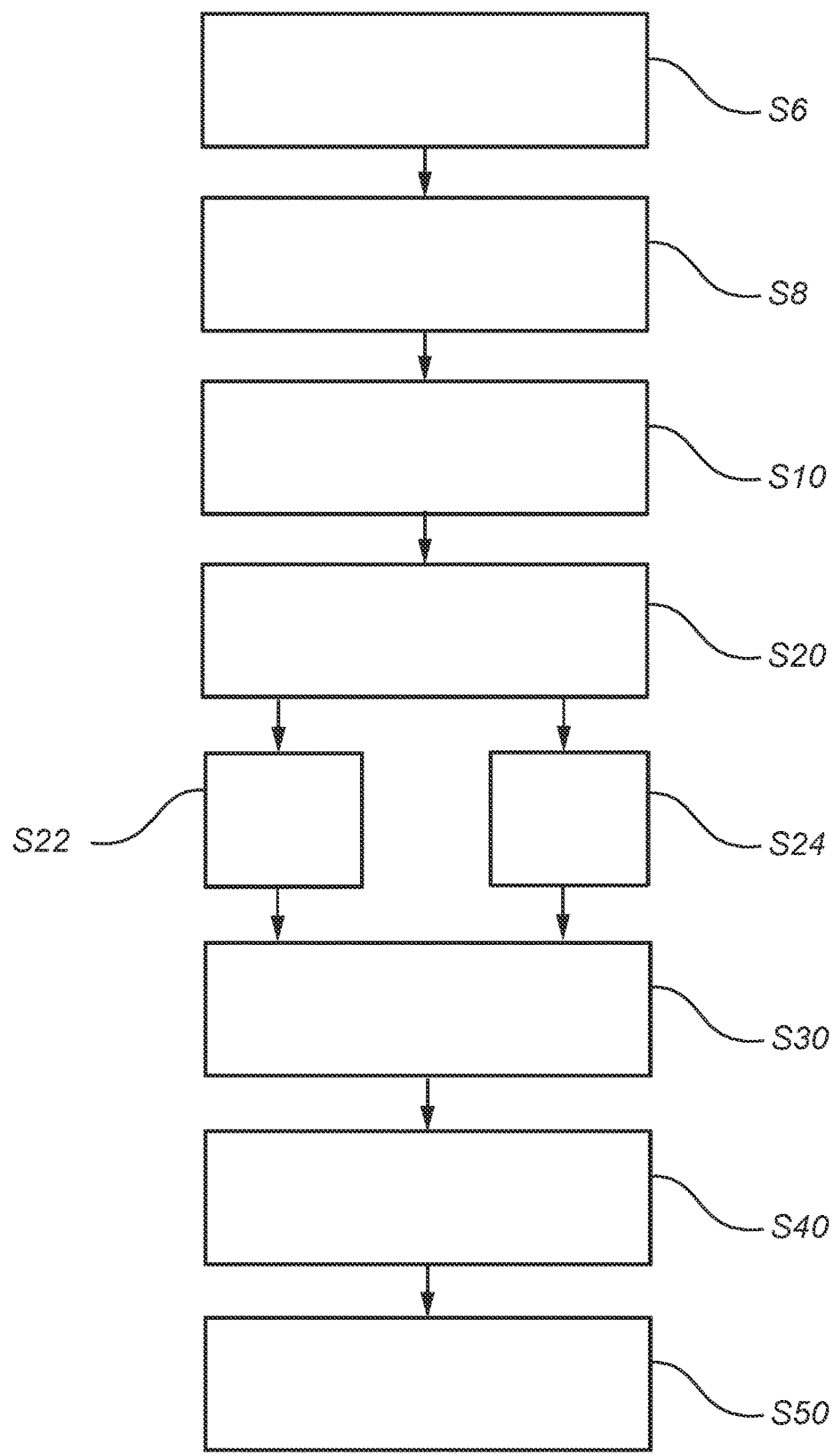
FIG. 3 is a flowchart illustrating the steps of a method in accordance with example embodiments of the invention.

The operation of a switching arrangement, as the switching arrangement 115, will now be described in more general terms with additional reference to FIG. 3. FIG. 3 is a flowchart describing the steps of a method for operating a switching arrangement of an energy storage system of a vehicle, the energy storage system comprising a common traction voltage bus and a plurality of parallelly arranged battery packs connectable to the common traction voltage bus, e.g. the common traction voltage bus 135 and the first, second and third battery packs 131, 132, 133 of FIG. 2, and the switching arrangement comprising an associated contactor for each battery pack, as the first, second and third contactors 141, 142, 143 of FIG. 2. The contactors are configured to connect and disconnect the battery packs to and from a power apparatus connected to the common traction voltage bus by closing and opening, respectively.

In a first step S10, a non-connected battery pack to be connected to the common traction voltage bus is identified. The identified battery pack may be one of a plurality of non-connected battery packs.

In a second step S20, the voltage difference between the common traction voltage bus and the identified battery pack is determined. However, it should be noted that the second step S20 may be performed prior to the first step S10, typically including determining the voltage difference between the common traction voltage bus and each one of the non-connected battery packs. Such information may be used as input into determining which of the non-connected battery packs to connected next.

In a third step S30, which may be performed in response to that the voltage difference between the common traction voltage bus and the identified battery pack is higher than a predetermined threshold value, the current of the common traction voltage bus is adjusted to reduce the voltage difference between the common traction voltage bus and the identified battery pack.

In a fourth step S40, performed in response of the voltage difference between the common traction voltage bus and the identified battery pack being lower than the predetermined threshold value, the contactor associated with the identified battery pack is closed to connect the identified battery pack to the common traction voltage bus. Typically, at least one battery pack is already connected to the common traction voltage bus during the connection of the identified battery pack to the common traction voltage bus. It should be mentioned that if step S30 is not performed in response to that the voltage difference between the common traction voltage bus and the identified battery pack is higher than a predetermined threshold value, the second step S20 may be performed after the third step S30 of adjusting the current of the common traction voltage bus. Thus, the fourth step S40 may then be performed in response to the second step S20.

In a first optional sub-step S6, battery current and battery voltage are provided for each one of the battery packs in the energy storage system. This may e.g. be achieved by the previously mentioned control unit 117 and the first, second, third and fourth sensors 151, 152, 153, 154 of the switching arrangement 115 of FIG. 2. For example, the control unit 117 is configured to receive the battery current and battery voltage of at least the non-connected battery pack(s) from any one of the first, second and third sensors 151, 152, 153. The first optional sub-step S6 may be performed prior to the first step S10.

Moreover, in a second optional sub-step S8, performed in response to the first optional sub-step S6, a plurality of non-connected battery packs is evaluated based on the battery current and/or battery voltage. This may be used as input to the first step S10, such that the identification of the non-connected battery pack to be connected to the common traction voltage bus is performed in response to such evaluation in step S8. The first and second optional sub-steps S6, S8 may be referred to as first and second optional pre-steps S6, S8 as they may be performed prior to the first step S10.

In a third optional sub-step S22, it is determined that the common traction voltage bus is at a higher voltage than the identified battery pack. This may e.g. be determined as a result of the second step S20 of determining the voltage difference between the common traction voltage bus and the identified battery pack. Hereby, the third step S30 of adjusting the current of the common traction voltage bus is typically achieved by a discharging current of the common traction voltage bus, represented by optional step S30a.

In a fourth optional sub-step S24, it is determined that the common traction voltage bus is at a lower voltage than the identified battery pack. This may e.g. be determined as a result of the second step S20 of determining the voltage difference between the common traction voltage bus and the identified battery pack. Hereby, the third step S30 of adjusting the current of the common traction voltage bus is typically achieved by a charging current of the common traction voltage bus, represented by optional step S30b.

The common traction voltage bus is typically connected to a power apparatus being a load and/or a power source, or alternatively connected to both a power apparatus being a load and to a power apparatus being a power source (i.e. the common traction voltage bus is shared by the load and the power source). The power apparatus is typically a controllable power apparatus, and the step S30 of adjusting the current of the common traction voltage bus may be performed by controlling the operation of the controllable power apparatus (e.g. to achieve the discharging current of step S30a, and/or the charging current of step S30b). The power apparatus is e.g. a motor and/or an inverter, or an external charger or an on-board charger.

Any one of the first step S10, second step S20, and the first to fourth optional sub-steps S6, S8, S22, S24 may be performed during a no power operation of the power apparatus (e.g. when the power apparatus is shut off). Moreover, in any one of the second step S20, and the first optional sub-step S6, the corresponding measurement or determination may be provided continuously.

In a final connection step S50, the contactor associated with the last non-connected battery pack is closed, such that all battery packs of the energy storage system are connected to the common traction voltage bus.

It should be noted that the naming of the steps not necessarily, but might according to at least one example embodiment, relate to the order in which the steps are carried out, unless explicitly stated otherwise. For example, the first and second steps S10, S20 may be carried out in a different order as previously described. Moreover, one or more of the steps may be combined and carried out simultaneously. The switching arrangement 115 of FIG. 2 may be configured to carry out one or several of the steps S6-S50.

It is to be understood that the present invention is not limited to the embodiments described above and illustrated in the drawings; rather, the skilled person will recognize that many changes and modifications may be made within the scope of the appended claims.

Additionally, variations to the disclosed embodiments can be understood and effected by the skilled person in practicing the claimed inventive concept, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A method for operating a switching arrangement of an energy storage system, the energy storage system comprising a common traction voltage bus and a plurality of parallelly arranged battery packs connectable to the common traction voltage bus, and the switching arrangement comprising an associated contactor for each battery pack, the contactors being configured to connect the battery packs to the common traction voltage bus by closing, and to disconnect the battery packs from the common traction voltage bus by opening, the method comprising:
identifying a non-connected battery pack to be connected to the common traction voltage bus next,
determining the voltage difference between the common traction voltage bus and the identified battery pack,
in response to the determined voltage difference between the common traction voltage bus and the identified battery pack being higher than a predetermined threshold value,
adjusting the current of the common traction voltage bus to reduce the voltage difference between the common traction voltage bus and the identified battery pack,
in response of the voltage difference between the common traction voltage bus and the identified battery pack being lower than a predetermined threshold value, closing the contactor associated with the identified battery pack to connect the identified battery pack to the common traction voltage bus.

2. The method according to claim 1, further comprising:
determining that the common traction voltage bus is at a higher voltage than the identified battery pack,
wherein the step of adjusting the current is achieved by a discharging current of the common traction voltage bus.

3. The method according to claim 1, further comprising:
determining that the common traction voltage bus is at a lower voltage than the identified battery pack,
wherein the step of adjusting the current is achieved by a charging current of the common traction voltage bus.

4. The method according to claim 1, wherein the switching arrangement comprises a control unit configured to receive battery current and battery voltage for each one of the battery packs in the energy storage system.

5. The method according to claim 4, further comprising:
in response to the received battery current and battery voltage of each one of the battery packs, evaluating a plurality of non-connected battery packs, wherein the step of identifying the non-connected battery pack to be connected to the common traction voltage bus is performed in response to such evaluation.

6. The method according to claim 1, wherein the common traction voltage bus is connected to a power apparatus being a load and/or a power source.

7. The method according to claim 6, wherein the power apparatus is a load being a motor and/or an inverter, or wherein the power apparatus is a power source being an external charger, an on-board charger or a fuel cell.

8. The method according to claim 1, further comprising the step of closing the contactor associated with the last non-connected battery pack, such that all battery packs of the energy storage system are connected to the common traction voltage bus.

9. The method according to claim 1, wherein the voltage difference between the common traction voltage bus and the identified battery pack is determined continuously.

10. The method according to claim 1, wherein at least a first battery pack is connected to the common traction voltage bus during the connection of the identified battery pack to the common traction voltage bus, wherein the first battery pack is another battery pack than the identified battery pack.

11. The method according to claim 1, further comprising connecting at least two of the battery packs in the energy storage system to the common traction voltage bus, wherein adjusting the current of the common traction voltage to reduce the voltage difference between the common traction voltage bus and the identified battery pack is performed for each connection of the two battery packs.

12. The method according to claim 1, wherein the steps of identifying a non-connected battery pack to be connected to the common traction voltage bus, determining the voltage difference between the common traction voltage bus and the identified battery pack, adjusting the current of the common traction voltage bus to reduce the voltage difference between the common traction voltage bus and the identified battery pack, and closing the contactor associated with the identified battery pack to connect the identified battery pack to the common traction voltage bus in response of the voltage difference between the common traction voltage bus and the identified battery pack being lower than a predetermined threshold value, are performed for at least two battery packs of the energy storage system, or for all of the battery packs of the energy storage system until all of the battery packs are connected to the common traction voltage bus.

13. The method according to claim 12, wherein each one of the battery packs in the energy storage system is associated with a predetermined individual number, and the method comprises connecting the battery packs to the common traction voltage bus in the predetermined numbered order.

14. The method according to claim 1, wherein the step of adjusting the current of the common traction voltage bus to reduce the voltage difference between the common traction voltage bus and the identified battery pack is performed for a predetermined time interval.

15. A non-transitory computer readable medium carrying a computer program comprising program code for performing the method according to claim 1, when the program code is run on a computer.

16. A switching arrangement for an energy storage system in a vehicle, the energy storage system comprising a common traction voltage bus and a plurality of parallelly arranged battery packs connectable to the common traction voltage bus, the switching arrangement comprising:

an associated contactor for each battery pack, the contactors being configured to connect the battery packs to the common traction voltage bus by closing, and to disconnect the battery packs from the common traction voltage bus by opening, a control unit configured to:
identify a non-connected battery pack to be connected to the common traction voltage bus next,
determine the voltage difference between the common traction voltage bus and the identified battery pack,
in response to the determined voltage difference between the common traction voltage bus and the identified battery pack being higher than a predetermined threshold value, adjust the current of the common traction voltage bus to reduce the voltage difference between the common traction voltage bus and the identified battery pack,
in response of the voltage difference between the common traction voltage bus and the identified battery pack being lower than a predetermined threshold value, close the contactor associated with the identified battery pack to connect the battery pack to the common traction voltage bus.

17. The switching arrangement according to claim 16, wherein the control unit is configured to adjust the current on the common traction voltage bus by controlling the operation of a power apparatus connected to the common traction voltage bus.

18. A vehicle comprising a switching arrangement according to claim 16.

* * * * *